Figure 1:
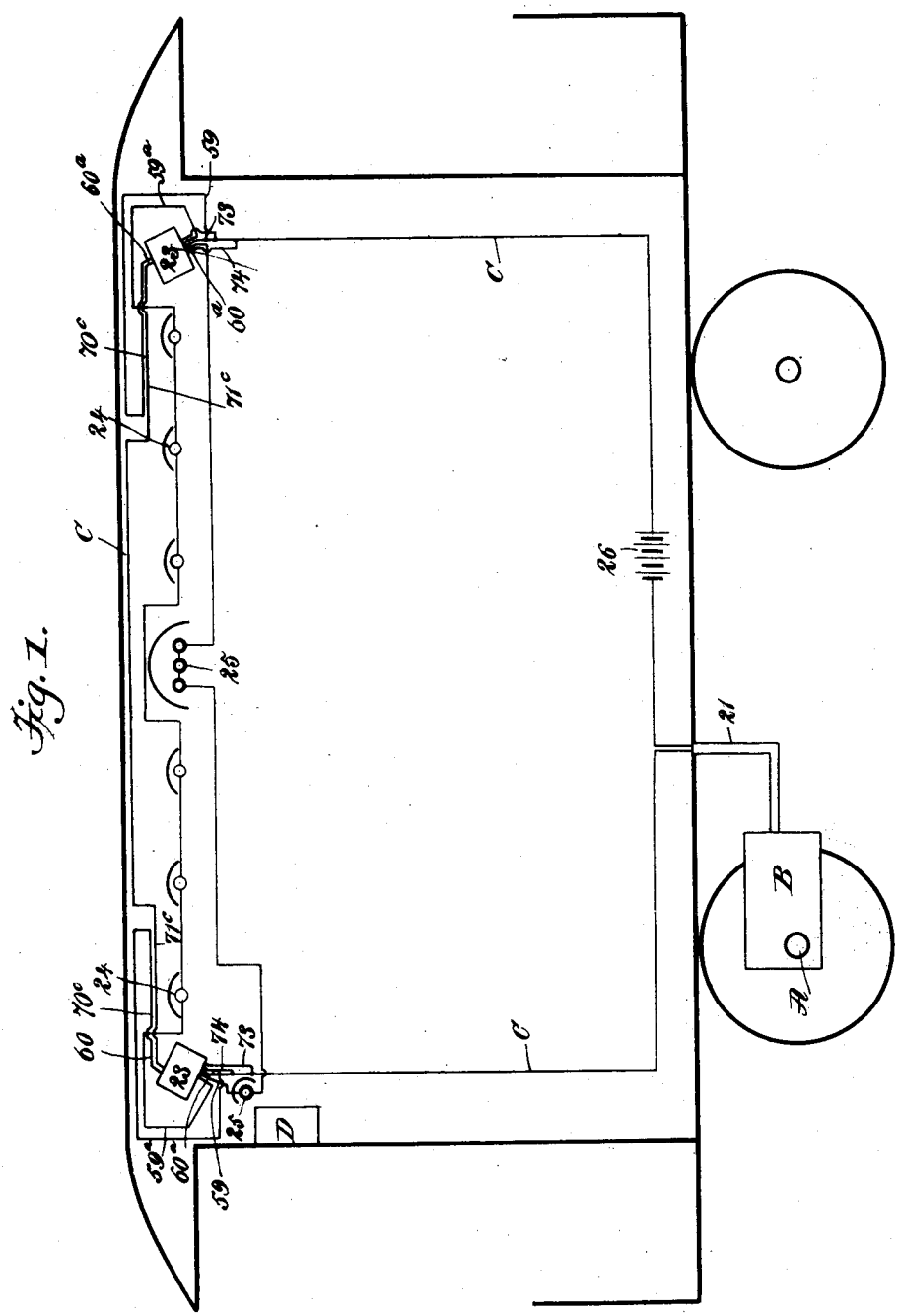

No. 711,935. Patented Oct. 28, 1902.
F. W. BROOKS.
AUTOMATIC PHOTOGRAPHIC DETECTOR DEVICE FOR PASSENGER CARS.
(Application filed Aug. 28, 1901.)
(No Model.)
5 Sheets—Sheet 1.

No. 711,935. Patented Oct. 28, 1902.
F. W. BROOKS.
AUTOMATIC PHOTOGRAPHIC DETECTOR DEVICE FOR PASSENGER CARS.
(Application filed Aug. 28, 1901.)

(No Model.) 5 Sheets—Sheet 2.

WITNESSES: INVENTOR
Frederick W. Brooks
BY
ATTORNEYS

No. 711,935. Patented Oct. 28, 1902.
F. W. BROOKS.
AUTOMATIC PHOTOGRAPHIC DETECTOR DEVICE FOR PASSENGER CARS.
(Application filed Aug. 28, 1901.)
(No Model.) 5 Sheets—Sheet 3.

WITNESSES:

INVENTOR
Frederick W. Brooks
BY
ATTORNEYS

No. 711,935. Patented Oct. 28, 1902.
F. W. BROOKS.
AUTOMATIC PHOTOGRAPHIC DETECTOR DEVICE FOR PASSENGER CARS.
(Application filed Aug. 28, 1901.)

(No Model.) 5 Sheets—Sheet 4.

WITNESSES
INVENTOR
Frederick W. Brooks
BY
ATTORNEYS

No. 711,935. Patented Oct. 28, 1902.
F. W. BROOKS.
AUTOMATIC PHOTOGRAPHIC DETECTOR DEVICE FOR PASSENGER CARS.
(Application filed Aug. 28, 1901.)
(No Model.) 5 Sheets—Sheet 5.

WITNESSES:
Edward Thorpe

INVENTOR
Frederick W. Brooks
BY
ATTORNEYS

UNITED STATES PATENT OFFICE.

FREDERICK W. BROOKS, OF BROOKLYN, NEW YORK.

AUTOMATIC PHOTOGRAPHIC DETECTOR DEVICE FOR PASSENGER-CARS.

SPECIFICATION forming part of Letters Patent No. 711,935, dated October 28, 1902.

Application filed August 28, 1901. Serial No. 73,587. (No model.)

*To all whom it may concern:*

Be it known that I, FREDERICK W. BROOKS, a citizen of the United States, and a resident of the city of New York, borough of Brooklyn, in the county of Kings and State of New York, have invented a new and Improved Automatic Photographic Detector Device for Passenger-Cars, of which the following is a full, clear, and exact description.

My invention relates to improvements in automatic recording detective registers for passenger-cars.

The purpose of the invention is to provide an automatic recording mechanism and means for operating the same for recording any or all, as in each case may be desired, the following data: the number and class of passengers, the distance ridden by each, the approximate time and place of ingress and egress of each passenger, identifying the conductor, the car, the trip, the day or night, the hour and minute of the day or night, and the approximate location of the car in order to obtain a true automatic register or record of the trip and the number of passengers carried independently of the coöperation and beyond the control of the conductor or fare-taker in order that the truth or falsity of the conductor's returns shall be shown and passenger-mileage reckoned, the records being taken in such manner that they may be used as lantern-slides, whereby the records may be enlarged and projected on a screen.

A further purpose of the invention is to provide automatic mechanism controlling electric circuits and connections to operate a photographic camera or cameras to be operated electrically and automatically at such intervals or distances apart as may be desired by and in consequence of the revolution of the car-wheels and governed by the number of such revolutions and to arrange the mechanism in such manner that said intervals may be changed or adjusted at will, the camera or cameras being so situated as to photograph the interior or part of the interior of the car, the platform or platforms and side running-boards, and any and all passengers that may come within its field, and, further, to so connect the camera or cameras with the electric appliances of the car as to properly light the field of the camera and to cut off objectionable or conflicting lights, also to protect said devices and their connections from malicious tampering.

The invention consists in the main of the following parts: mechanical, electrical, photographical, and optical, and the combination and coöperation of all or any of them, which will be hereinafter more particularly described, and pointed out in the claims. These parts may be briefly summed up as follows: first, a device connected with and operated by the revolution of a wheel or axle of the car and an electrical connection by which the operations of the camera and registers and the distance between such operations are actuated and controlled; second, an electric current from any available source, preferably a battery, either primary or storage, situated in such part of the car as may be deemed most convenient and connected by conductors with the above device, by which the circuit or circuits are opened or closed, the opening and closing of the electric currents being arranged to operate the camera or cameras, the registers, and the lighting and de-lighting of the car; third, a method for automatically lighting the car in such portions as are desired and means for shutting off conflicting or objectionable lights.

I am aware of the claims granted in the Patent No. 610,971 for a camera in an ordinary railway-car operated by a tappet device placed near the railway-track and actuated by the pressure of air from the cylinder of the air-brake and lighted by a flash from magnesium or acetylene, all of which I disclaim, as primarily my invention consists in the combination of one or more combined and compensating cameras, the shutters of which are operated by electricity and governed and controlled by the revolution of a wheel of a car, serving to open and close the current from an electric or galvanic battery, the car being lighted by electricity, such light being changed or regulated as desired with or without a register or clock in order to record or locate or identify the car, or the conductor, or the day or time of day, or the distance traveled, or conductor's record of fares, or passenger-mileage.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
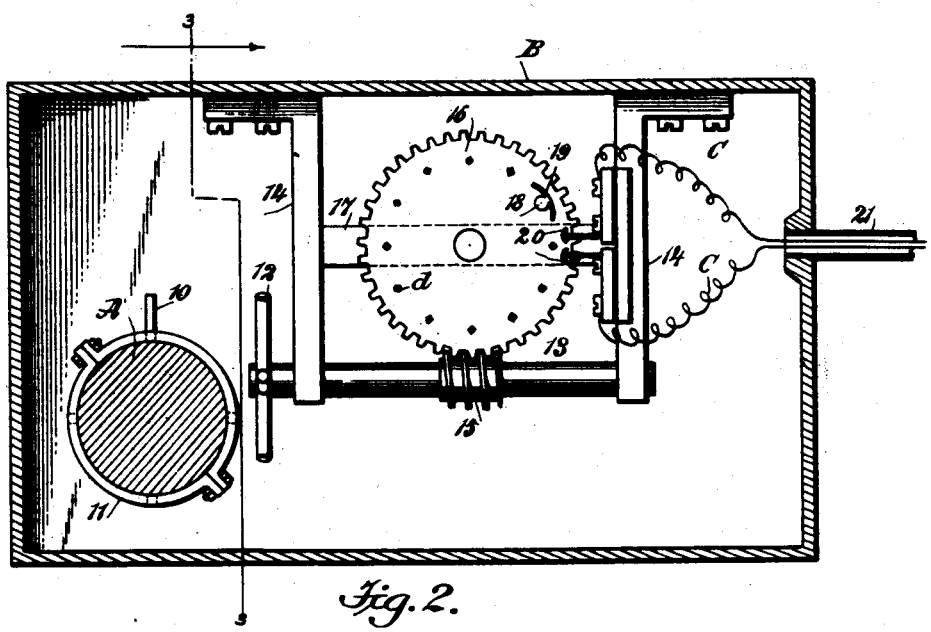
Figure 3:
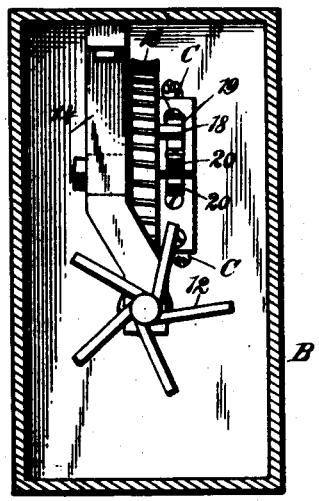
Figure 4:
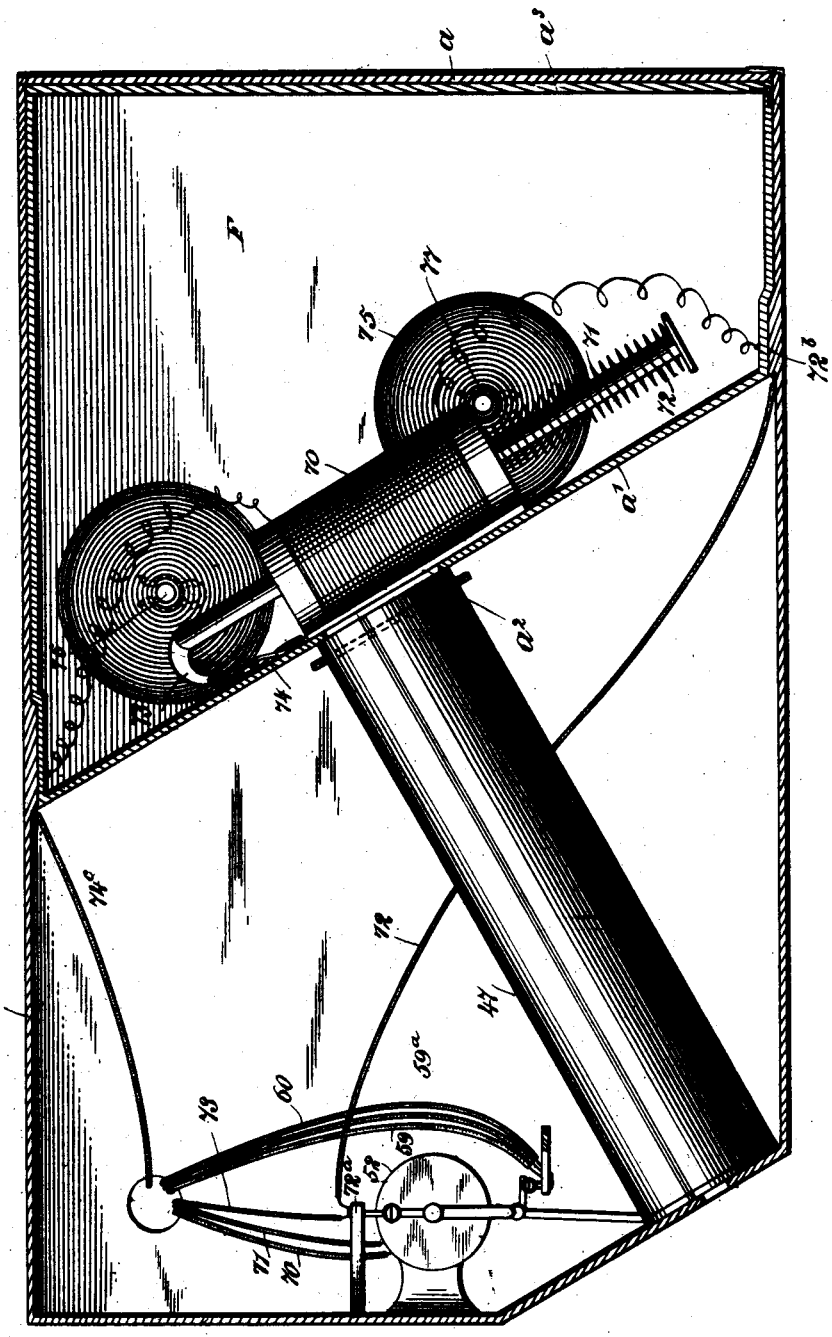
Figure 5:
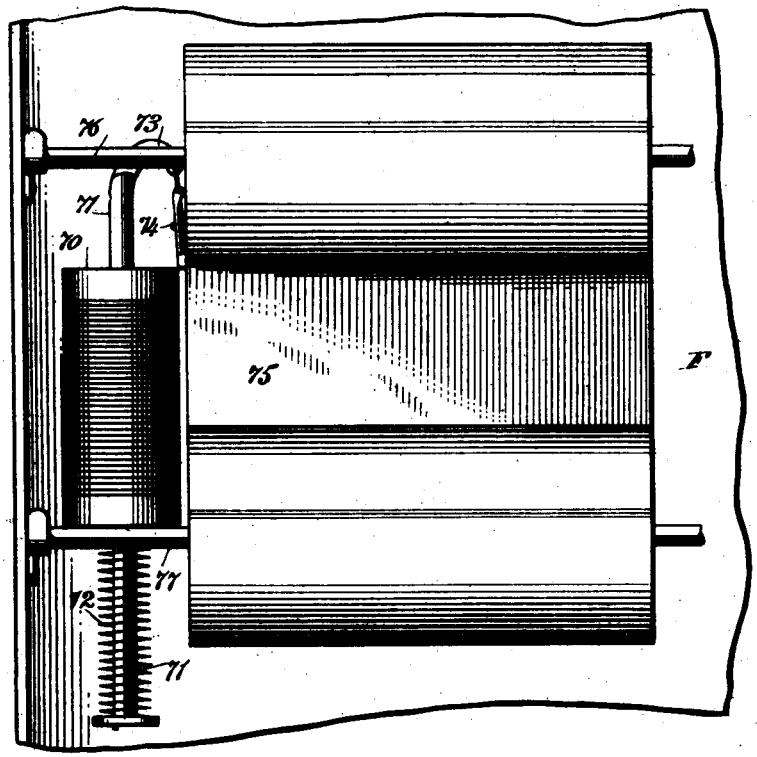
Figure 6:
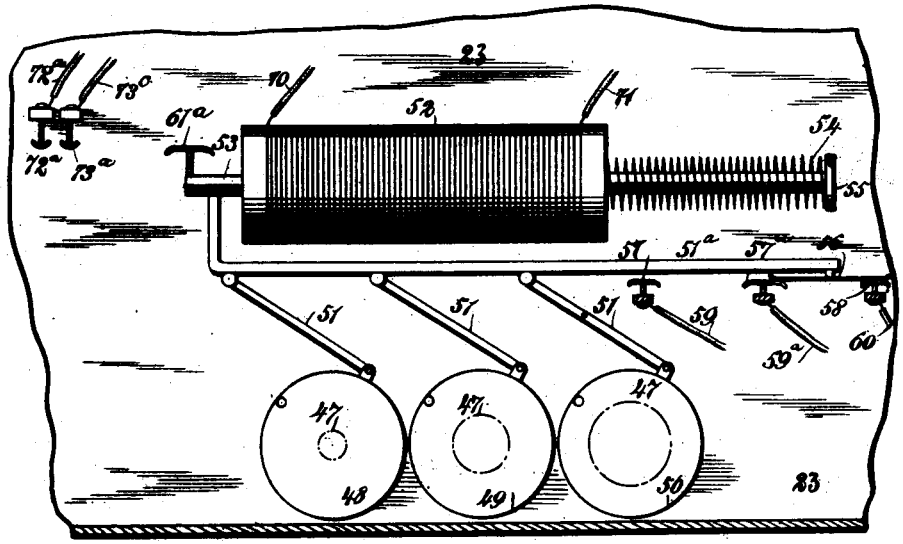
Figure 7:
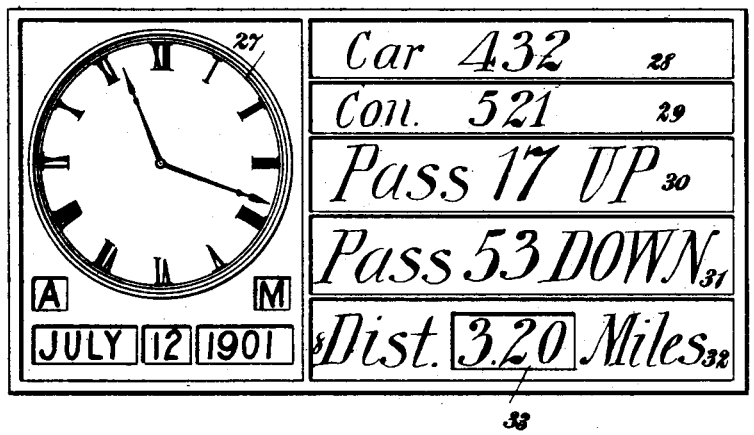
Figure 8:
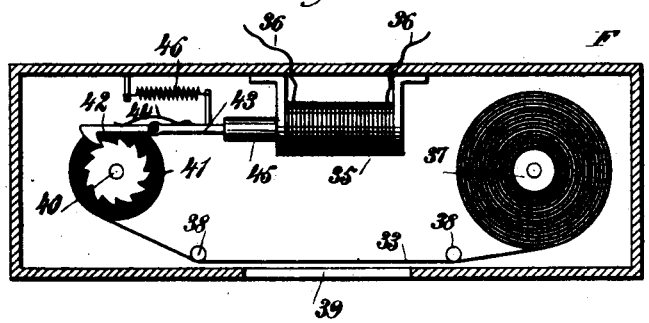

Figure 1 is a diagrammatic view of a car, showing the system of wiring. Fig. 2 is a vertical longitudinal section of the make-and-break mechanism for the main circuit, showing an axle in cross-section. Fig. 3 is a transverse section of the same, taken on the line 3 3 of Fig. 2. Fig. 4 is a vertical longitudinal section of the camera, illustrating means for operating the films and the shutters. Fig. 5 is a side view of the removable film-carrying box. Fig. 6 is an inside view of the front of the camera, showing the shutters and connections. Fig. 7 is a front elevation of a register or bulletin and clock which may be used in connection with a car having the improvement applied, the register being provided with a record of the distance traveled and such other data as may in each case be desired to be recorded; and Fig. 8 is a longitudinal section through an electric device for operating the distance-tape of the register.

Figs. 2 and 3 represent the actuating device, which is attached to the truck of the car, showing the manner of operating my devices automatically by the revolution of an axle of the car.

A represents the axle of a car provided with one or more spurs 10 in the circumference of the axle which will best befit the frequency of the operation desired and which may be set directly into the substance of the axle, though preferably for convenience in change and repair the said spurs are set into a collar 11, clamped or otherwise secured around the axle. The spur or spurs 10 are so arranged and situated that when the axle revolves they will engage the spokes of a wheel 12. The number of spokes in said wheel 12 is such as may be required to give the necessary frequency of revolution to the shaft 13, upon which the said wheel 12 is secured. This shaft is journaled in hangers 14, secured to a wall of a case or shell B, through which the axle A passes and which may be supported beneath the car in any approved manner. This shell may be made of any desired substance, preferably steel, and is intended to prevent the devices inclosed thereby being maliciously meddled with. Said shell B may be provided with any safe method of opening and closing.

The shaft 13 is provided with a worm-thread 15, so situated and arranged as to mesh with the worm-wheel 16, mounted to revolve in suitable bearings 17, as shown in Fig. 2. This worm-wheel 16 is provided with one or more spurs 18, having contact-faces 19, shown in the arc of a circle. The number of spurs 18 employed is in accordance with the frequency of contact desired, and said spurs 18 are so arranged that the number of them may be changed at pleasure. These spurs 18 project from the disk portion of the wheel 16 in such manner that each will at each rotation of the wheel 16 make electric or magnetic contact with two projections 20 and close an electric circuit at such points. The contact projections 20 are attached to and insulated through the hangers 14 and are part of an electric circuit C (shown in Fig. 3) and are the means of closing and completing or of breaking the circuit, in consequence of the action of the spur 18, through what may be termed the "sliding-bridge" switches 19 and 20.

The wires of the circuit C are led into a conduit 21, which conduit is attached to and opens into the case or housing B. The conduit is made of such material as to prevent malicious tampering with its contents, and this conduit or conductor is led by any suitable means or route to the batteries, camera-lighting devices, registers, &c., as will be hereinafter described.

It will be understood that the case or housing B is attached to the truck of the car in such manner and position as not to interfere with the action or operation of the contained mechanism through the revolution of the axle A. With reference to the diagrammatic view shown in Fig. 1, in which the car shown may be an electric car or a horse tram-car, open or closed, operated by overhead trolley, third rail, storage battery, underground rail, or other power, in such car one or more electrically-controlled compound cameras 23 are placed in overhead position, one near each end of the car, in such position that the camera near the front end of the car will have for its field the rear portion of the car, including the platform, and in an open car the side running-boards, also, if desired, the register, the clock or calendar-clock, (shown in Fig. 7,) and such other data as may be desired to be automatically recorded, the camera at the rear end of the car operating in like manner to photograph the front portion of the car. The register D, including a clock, if a clock is employed, is located, preferably, at one end only of a car, as is shown in Fig. 1, and this register in its preferred form is shown in detail in Fig. 7 and will be hereinafter described.

The usual incandescent electric lights 24 employed for ordinary lighting purposes may be placed wherever desired, and these lights 24, though usually kept in circuit when the car is running at night, may be cut out of circuit when the shutters of the camera are opened by the automatic action of the switch shown in Fig. 7 and to be hereinafter particularly referred to.

In addition to the ordinary lights 24 above mentioned additional incandescent lights 25 are placed in such position as may be deemed best to light the portions of the car being photographed, each camera-light 25 being so screened as to prevent the light therefrom falling directly into the camera operating therewith, and a current therefor is arranged in such manner that the going out of the lights 24 will shunt the current through the camera-lights 25 to be used for such camera while in operation and to be in turn cut out, and the current will return to the lights 24 when the shutter of the camera is again closed.

I do not lay claim to the method of wiring or electric connection above referred to, and therefore have not delineated the circuits nor particularly described them, as any ordinary expert electric workman can run the wires necessary to accomplish the purpose required.

An electric primary or storage battery 26 is placed in any desirable position in the car and is connected to and from the cameras, registers, lighting apparatus, and actuating devices by any desirable method of wiring. The wiring in exposed places is to be carried in a conduit similar to the conduit 21 described, the conduit being led as required by the conditions of construction of the car.

In Figs. 7 and 8 I have shown a conductor's register F and clock or calendar-clock 27, on which may be shown such data as is thought desirable to keep a full check on the conductor and identify the car, the conductor, the trip, the day, time of the day, the number of passengers, and the distance traveled, which being made part of the photographic record precludes all uncertainty and completes the evidence.

In the construction of the register the upper and next lower panels 28 and 29 are stationary but removable and respectively present the number of the car and the number of the conductor. The third and fourth panels 30 and 31 may also be removable, but the numerals appearing at such panels and indicating the passenger-record may be rung up by the conductor, as is customary and in any well-known manner. The last panel 32, which represents the distance in miles traveled by the car, is provided with a traveling tape 33 or similar appliance having numerals thereon indicating miles and fractions thereof. This distance slip or tape is automatically operated from the axle A through a solenoid-coil 35 (shown in Fig. 8) synchronously with the camera, showing the distance the car has traveled from its starting-point.

With reference to Fig. 8 the solenoid 35 is suitably mounted in the casing of the register and is connected by the wire 36 with a storage battery or other source of electrical supply. The tape 33 is wound around the drum 37 and is passed in contact with guide-rollers 38, crossing an opening 39 in the registry-casing to a second drum or shaft 40, provided with an attached ratchet-wheel 41, which ratchet-wheel is engaged by a pawl 42, hinged to a shank 43, said shank being connected with the core 45 of the solenoid. The pawl is held in a horizontal position by a spring 44, connected with the shank, and the core 45 is drawn outward from the solenoid by a spring 46, connected with the shank of the pawl and a wall of the casing of the register. When the circuit of which the wires 36 form a part is closed, the core of the solenoid is drawn inward and the ratchet-wheel 41 is turned, changing the position of the distance slip or tape 33. As has been heretofore stated, the opening and closing of the solenoid-circuit is accomplished by the revolution of an axle or wheel of the vehicle.

In Figs. 4 and 6 I have illustrated a compound camera 23 with preferably three sights 47, in which the variableness of the light is compensated for by having a different-sized aperture at the lens of the several cameras, with the object or purpose of always obtaining an impression or record on the film or plate, if such be used, by the same average time of exposure, as when the light is very intense the records at 50 and 49 may be overexposed and burned out, while the sight at 48 being partly obscured will secure a record, as the opening at 50 is the largest, the next largest opening being at 49 and the smallest at 48, and the said parts 48, 49, and 50 indicate shutters for the sights 47. If the light is of moderate strength, the intermediate-sized sight, or that which is at the shutter 49, will secure a record, while the smallest sight will be deficient in exposure and the largest sight will be overexposed. If the light be very weak, then the largest sight will obtain a record, while the intermediate-sized and the smallest-sized sights will be insufficiently exposed and the picture-record given out by them will be more or less incomplete.

The shutters 48, 49, and 50 of the camera are controlled by rods 51, connected with the core 53 of a solenoid 52 through the medium of a shifting bar 51$^a$, the connection being in such manner that the movement of the solenoid-core 53 will open and close the shutters, which solenoid-core 53 is actuated by the closing of the circuit C, as shown in Fig. 2, at the bridge-switches 20. The solenoid-core is returned to place to close the shutters by the action of the spring 54, encircling the core 53 and having bearing against a head 55 on the core and the end of the body or coil of the solenoid. With reference to Fig. 6 a switch 56 is carried by the shifting bar 51$^a$, adapted in the movement of the shifting bar to engage with bridge or contact points 57, 57$^a$, and 58. The bridge or contact points 57$^a$ and 58 are respectively connected with the usual or regular electric-lighting wires 59$^a$ and 60, connected in circuit while the camera is closed, the current then being only on the wire 59$^a$. The third bridge or contact point 57 is connected with a camera-lighting wire 59, thrown into circuit by the movement of the switch 56 when the shutter of the camera is opened, thus shutting off the regular or usual lights 24 and shunting the current through the auxiliary lights 25 or the lights assigned to illuminate the car for photographing and on the return of the solenoid-core 53 and the closing of the camera to return the lighting-current to its usual course. This lighting-circuit is arranged so that, if desired, it may be used day and night or day or night, so that there may always be sufficient light even when passing through shady places or on cloudy days or at twilight, while the variation of light is compensated for by the camera, as above described.

The lenses of the camera are suitably supported at their inner ends within their frames, as shown in Fig. 4, and each camera frame or casing is provided with a door $a$ to receive a dark box F or a box or other receptacle which is to receive the films, preferably, or plates for exposure, and said box F is shown as provided with an inclined front $a'$, having an aperture or apertures $a^2$ to receive the lens tube or tubes of the camera, which tubes are preferably supported at their inner ends, as is shown in Fig. 4. The inner portions $a'$ of the dark box are provided with openings $a^2$, as stated, to receive the inner ends of the lens-tubes, as is shown in the same figure. Each dark box is provided with a solenoid 70, the core 71 of which is spring-controlled in one direction by a spring 72, shown coiled around the core and bearing against the body of the solenoid and one end of the core, as is shown in Figs. 4 and 5.

The dark box is provided with two shafts or drums 76 and 77, mounted to rotate therein, which shafts may be removed at any time from the dark box by opening a door $a^3$, provided at one end or side of the box, and the said shafts 76 and 77 are represented as carrying a film 75, which film passes from one shaft or drum to the other over the opening $a^2$, and the sheet of film is actuated by the movement of the core of the solenoid 70 through the medium of clamps 74, carried by the core 71 of the solenoid 70 at that end opposite which the spring is located, and in order to properly support the clamp 74 the end of the core of the solenoid to which it is attached is more or less curved or formed in the shape of a hook 73, as is shown in Figs. 4 and 5. This clamp 74 is so arranged that it will grip the film when it is to be drawn past the opening $a^2$, but will have no influence on the film when the solenoid-core 71 is returned to its normal position. It will be understood that the winding-shaft 76 may be spring-controlled in any manner which will enable the winding drum or shaft 76 to take up the slack of the film and to keep the film straight before the exposure-opening $a^2$.

C represents the main or lighting circuit, as is shown in Fig. 1. The wires 70$^c$ and 71$^c$ lead from the shutter-solenoid 52 for the operation thereof, (see Fig. 6,) and the wires 59$^a$ and 60$^a$ are the main-light wires. The wires 59 and 59$^a$ are for the auxiliary lights. The wire 72$^c$ leads from the make-and-break connection 72$^a$ to the contact-pins 72$^b$. (See Fig. 4.) The wire 73 leads from the make-and-break connection to the main circuit, while the wire 74 leads also to the main circuit. Each of the wires 72$^c$ and 73$^c$ is provided with the contact-points 72$^a$ and 73$^a$, (shown in Fig. 6,) and these points are illustrated as of semicircular form and may be termed "bridge-switches," since they are to be engaged by a similar switch 61$^a$, which is carried by the core 53 of the shutter-solenoid 52, and the contact between the switch 61$^a$ of the solenoid-core 53 and the bridges 72$^a$ and 73$^a$ is brought about when the core 53 of the shutter-solenoid 52 has been energized and carried outward, placing the spring 54 under tension.

In general the operation of the mechanism may be described as follows: The revolution of the axle of the car connects the current of electricity which opens the shutter of the camera, at the same time turning off the general or usual lights in the car and turning on the lights which are especially devised and placed to light those portions of the car to be photographed, and simultaneously moves the distance-tape 33, (shown in Fig. 7,) at which the camera or cameras take the record of the car-number, the conductor's number, photographing the conductor, the number of fares rung up by the conductor on the register, the locality, the year, the month, the day, the hour, and the minute of taking the record, the number and class of passengers in the car, distinguishing thereby such officials as are entitled by law to ride free, including employees of the road in uniform, and children. These records may be arranged to be taken as frequently or as infrequently or at such distance apart as may be desirable by altering the number of spurs 10 on the car-axle A, or provision may be made to such end by increasing the number of the contact-bridges 19, carried by the spurs 18 on the wheel 16, around which wheel 16 apertures $d$ have been made, each adapted to receive such contact-bridge.

At such time and places as may be desired the film-spools containing a record may be taken out (inclosed in a dark box) and developed and printed in any suitable way and by any suitable process and may be fitted for enlargement on a screen—for example, by a magic lantern, a stereopticon, or a light adapted for the purpose.

Having thus described my invention, I claim as new and desire to secure by Letters Patent—

1. An automatic photographic detective register for cars, comprising mechanism connected with the running-gear of the car and movable relatively to said car, an electric circuit to be intermittingly opened and closed by said mechanism, a camera provided with a movable shutter and mounted upon said car, and a magnetic member for intermittingly actuating said shutter, thus producing a plurality of images in rapid succession.

2. An automatic photographic detective register for cars, comprising a camera provided with a movable film and a movable shutter, separate magnetic members for actuating said film and said shutter, a source of electricity for supplying a current to said magnetic members, and means controllable automatically by the movements of the running-gear of the car for putting said respective magnetic members out of and into circuit.

3. An automatic photographic detective register for cars, comprising a camera provided with a movable film and a movable shutter, separate magnetic members for actuating said film and said shutter intermittingly and at different moments, and means controllable automatically by the movements of the car for intermittingly energizing said magnetic members.

4. An automatic photographic detective register for cars, comprising a camera provided with an electrically-operated shutter, electric lights to be periodically cut out of and into circuit at intervals corresponding to the movements of said shutter, means for supplying a current to said shutter and said lights, and means controllable automatically by the running-gear of the car for intermittingly cutting said shutter and said lights out of and into circuit.

5. An automatic photographic detective register for cars, comprising a camera, electric lights to be flashed intermittingly for the purpose of illuminating the field of said camera, an electric circuit for supplying a current to said lights, and means controllable automatically by the movements of the running-gear of said car for cutting said lights into and out of circuit.

6. An automatic photographic detective register for cars, comprising a camera, an electrically-governed shutter for the same, electric lights, means for supplying a normally constant current to said shutter and said lights, and a device automatically controlled by the running-gear of the car for cutting said shutter and said lights into and out of circuit as occasion requires.

7. An automatic photographic detective register for cars, comprising a camera provided with an electrically-operated shutter, a solenoid-coil for actuating said shutter, electric lights for coacting with said camera, a switch actuated by said solenoid-coil for controlling said lights, and means automatically controlled by the running-gear of the car for intermittingly cutting said solenoid and said electric lights into and out of circuit.

8. An automatic photographic detective register for cars, comprising a camera provided with an automatic shutter, electric lights to illuminate the field of said camera, irrespective of lights ordinarily in use, and means controllable automatically by the running-gear of the car for periodically cutting off said other lights normally in use.

9. An automatic photographic detective register for cars, comprising a plurality of cameras adapted to different degrees of illumination, a film common to all of said cameras, means for actuating said film, shutters for all of said cameras, an electric device for actuating all of the said shutters, means for supplying a current to said electric device, and means controllable automatically by the running-gear of the car for periodically cutting the said electric device out of and into circuit.

10. An automatic photographic detective register for passenger-cars, comprising a camera, a shutter therefor, a magnetic member for actuating said shutter in one direction, a spring for retracting said shutter, a source of electrical supply for energizing said magnetic member, a movable film, means for intermittingly actuating the same, and means automatically actuated by the running-gear of the car for intermittingly cutting said shutter out of and into circuit.

11. An automatic photographic detective register for cars, comprising a camera provided with a film and a shutter, separate magnetic members for controlling said shutter and said film, an electric circuit for alternately actuating said magnetic members, and means automatically actuated by the running-gear of the car for intermittingly opening and closing said electric circuit.

12. An automatic photographic detective register for cars, comprising a camera, an electrically-operated shutter for the same, electrically-operated film-moving devices coacting with said shutter, electric devices for operating said shutter and said film-moving devices, and a contacting device located in said electric circuit and actuated periodically by the rotation of the axle of the car.

13. An automatic photographic detective register for cars, comprising a camera mounted upon a car and provided with an electrically-controlled shutter, an electric circuit controlled by movements of the car for operating said shutter, electric lamps connected separately with said shutter, and means for automatically shifting the current from one to another of said lamps synchronously with the movement of the said shutter.

14. An automatic photographic detective register for cars, comprising a camera mounted upon a car and provided with a movable shutter and with a movable film, separate electric devices for actuating said shutter and said film, a source of electrical supply, and means controllable by movements of the car for periodically cutting said electric devices out of and into circuit.

15. An automatic photographic detective register for cars, comprising a camera mounted upon a car and provided with a movable shutter and with a movable film, separate electric devices for actuating said shutter and said film alternately, a source of electrical supply common to both of said electric devices, and means controllable by movements of the car for alternately shifting the current from one of said devices to the other.

16. An automatic photographic detective register for cars, comprising a camera mounted upon a car and provided with a movable shutter, an electromagnetic device for controlling said shutter, a film, an electromagnetic device for controlling said film, a source of electrical supply, means controllable by the movements of the car for throwing said first-mentioned electromagnetic device into and out of circuit, and means for automatically throwing a second electromagnetic device into and out of circuit alternately with the first-mentioned electromagnetic device.

17. An automatic photographic detective register for cars, comprising a camera mounted upon a car and provided with a movable shutter and with a movable film, separate solenoids for actuating said shutter and said film, a source of electricity for actuating said solenoids, mechanism automatically controllable by the movements of the car for governing the supply of electricity, and means for automatically shifting the current from one of said solenoids to the other.

18. An automatic photographic detective register for cars, comprising a camera mounted upon a car and provided with a movable shutter and with a movable film, separate solenoids for actuating said shutter and said film, a source of electricity for actuating said solenoids, mechanism automatically controllable by the movements of the car for governing the supply of electricity, members for automatically switching the current from one solenoid to the other, electrical lamps normally connected with said supply of electricity, and means for automatically throwing said lamps into and out of circuit.

19. An automatic photographic detective register for cars, comprising a camera mounted upon a car and provided with a shutter and with a movable film, separate solenoids for actuating said shutter and said film, a source of electricity, a plurality of electric lamps separately connected therewith, mechanism automatically controllable by the movements of the car for governing the supply of electricity and for automatically shifting the current from said source of electricity to said solenoids alternately, and means for automatically shifting said electric current to said lamps alternately.

In testimony whereof I have signed my name to this specification in the presence of two subscribing witnesses.

FREDERICK W. BROOKS.

Witnesses:
J. FRED. ACKER,
EVERARD B. MARSHALL.